US007555728B2

(12) United States Patent
Esaki et al.

(10) Patent No.: US 7,555,728 B2
(45) Date of Patent: Jun. 30, 2009

(54) PREVENTING UNINTENTIONAL SELECTION OF A TOUCH PANEL BUTTON VIA GRAY OUT FOR A PREDETERMINED TIME

(75) Inventors: Yasuhiro Esaki, Ibaraki-ken (JP); Takayuki Hayashi, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 316 days.

(21) Appl. No.: 11/238,995

(22) Filed: Sep. 30, 2005

(65) Prior Publication Data

US 2006/0107235 A1 May 18, 2006

(30) Foreign Application Priority Data

Nov. 18, 2004 (JP) ............................. 2004-335082

(51) Int. Cl.
*G06F 17/00* (2006.01)
(52) U.S. Cl. ........................................ 715/824; 715/851
(58) Field of Classification Search ................ 715/764, 715/851, 824, 702; 345/173, 179
See application file for complete search history.

(56) References Cited

U.S. PATENT DOCUMENTS 7,174,515 B1 * 2/2007 Marshall et al. ............ 715/763
7,480,638 B1 * 1/2009 Sze .............................. 705/80
2005/0099400 A1 * 5/2005 Lee ............................ 345/173
2005/0164794 A1 * 7/2005 Tahara ......................... 463/43
2005/0181337 A1 * 8/2005 Shaw .......................... 434/219
2005/0210373 A1 * 9/2005 Litwiller ..................... 715/512

FOREIGN PATENT DOCUMENTS

JP          2003-209719         7/2003

* cited by examiner

*Primary Examiner*—Doug Hutton
*Assistant Examiner*—Daeho D Song
(74) *Attorney, Agent, or Firm*—The Nath Law Group; Jerald L. Meyer; Jiaxiao Zhang

(57) ABSTRACT

A display unit displaying an image and selection buttons on a display screen is provided, and a touch panel in which a desired position on the display screen can be specified is provided on the display unit. Furthermore, a coordinate detection unit and a button processing unit are provided. The coordinate detection unit detects coordinates of a position where a touch operation is performed on the touch panel. The button processing unit operates a tool corresponding to a selection button located at the coordinates and displayed on the display screen and performs a process of disabling a specification operation of a selection button newly displayed in a predetermined range including the coordinates and the vicinity thereof for a predetermined period of time.

7 Claims, 5 Drawing Sheets

PREVENTING UNINTENTIONAL SELECTION OF A TOUCH PANEL BUTTON VIA GRAY OUT FOR A PREDETERMINED TIME

BACKGROUND OF THE INVENTION

1. Field of the Invention

The present invention relates to an image processing device including a touch panel, and more specifically, relates to a technology to improve operability when specifying a selection button displayed on a screen.

2. Description of the Related Art

For example, some image forming devices include an image processing device called a digitizer in which an area is specified in original document data and various types of image decorations are applied thereto. The image processing device displays an original document image on a display screen. The image processing device further includes a function to operate a tool corresponding to each of various selection buttons such as zoom-in, zoom-out, move, and area select buttons, and apply decorations to a selected area. Herein, the decorations include specification of a type such as character or photo type and specification of shading.

Such an image processing device often employs means using a touch panel as entry means for selecting an operation button displayed on the screen or specifying a desired point in an image displayed on the screen. The entry operation is performed by directly touching a screen of the touch panel with a user's finger, a touch pen, or the like. The use of the touch panel has an advantage in that a desired point can be directly specified on the screen.

However, the touch panel is operated by a user making a direct entry on the image with his/her finger or the touch pen, and wrong operations could be caused in many cases. For example, when the user performs an operation of touching a desired button with a finger but accidentally touches a different selection button, the display is often changed to a different screen that the user does not intend at all. In such a case, it is necessary to go back to the original screen in which the desired selection button is displayed and carry out the entry operation again.

When touching a position of a desired selection button on the touch panel to specify the desired selection button, sometimes, the same position is touched more than once. At this time, when the selection button displayed at the touched position is changed to a different selection button by the first touch operation, the second touch operation is regarded as specifying the different selection button in the entry operation, thus causing a problem of specifying the selection button which the user does not intend.

Therefore, for example, the Japanese Patent Laid-open publication No. 2003-209719 discloses the following technology. Even when a wrong selection button which is not a selection button to be specified is touched and the display screen is then changed, the specified selection button is displayed on the screen after the change. The user can therefore easily return to the original screen and specify the desired selection button.

SUMMARY OF THE INVENTION

The conventional art disclosed in the aforementioned patent literature is effective as a countermeasure for restoring the operation when making a mistake in the operation of specifying a selection button. However, there is a problem in that the conventional art cannot cope with a case where a desired selection button is accidentally touched more than once.

It is an object of the present invention to provide an image processing device which can prevent an input of an operation not intended by a user even when the user accidentally touches more than once at the same position or the vicinity thereof on the touch panel.

To achieve the above object, a first aspect of the present invention is an image processing device including: a display unit displaying an image and a selection button on a display screen; a touch panel provided on the display screen, in which a desired position on the display screen can be specified by a touch operation; and a button processing unit, when the selection button displayed on the display screen is specified, disabling for a predetermined period of time a specification operation of a selection button newly displayed in a predetermined range including coordinates of the position specified by the touch operation and the vicinity thereof.

According to the first aspect of the invention, when an arbitrary selection button is specified by the touch operation among various selection buttons displayed on the display unit, the operation of specifying the selection button newly displayed in the predetermined range around the coordinate position of the point of contact is disabled for the predetermined period of time, and the selection button cannot be specified for this predetermined period of time. Accordingly, even when a user accidentally performs the touch operation more than once at the position of this selection button on the touch panel when specifying the selection button, the touch operation on and after the second time is disabled, and it is possible to avoid an input of an operation not intended by the user, thus improving the operability.

A second aspect of the present invention is an image processing device including: a display unit displaying an image and a selection button on a display screen; a touch panel provided on the display screen, in which a desired position on the display screen can be specified by a touch operation; a coordinate detection unit detecting coordinates of the position; and a button processing unit operating a tool corresponding to the selection button which is located at the coordinates and displayed on the display screen and disabling, for a predetermined period of time, a specification operation of a selection button newly displayed in a predetermined range including the coordinates on the display screen and the vicinity thereof.

According to the second aspect of the present invention, the same effect as the first aspect can be produced.

The selection button newly displayed may be different in type from the selection button.

With the above configuration, even when the operation button newly displayed on the display screen is changed by the first specification operation of the selection button, the specification operation of the selection button displayed after the change is disabled. Accordingly, it is possible to prevent the specification operation not intended by the user from being performed for the operation button newly displayed.

The button processing unit may display the selection button with the specification operation disabled by an operation unavailable indication.

With the above configuration, the selection button with the specification operation disabled is displayed by the operation unavailable indication, such as a grayed out indication. Accordingly, the user can easily recognize that the specification operation of the selection button is disabled, which can prevent an unnecessary operation of specifying the disabled selection button.

BRIEF DESCRIPTION OF THE DRAWINGS

FIG. 6A showing a state where an "OK" button is displayed; FIG. 6B showing a state where the "OK" button is disabled and grayed out after the "OK" button is specified; and FIG. 6C showing a state where the disabled state of the "OK" button is terminated after a predetermined period of time.

FIG. 7A showing a state where the "OK" button is displayed; FIG. 7B showing a state where an "END" button is displayed after the "OK" button is specified; and FIG. 7C showing a state where the "END" button is accidentally specified.

DESCRIPTION OF THE PREFERRED EMBODIMENT

Figure 1:
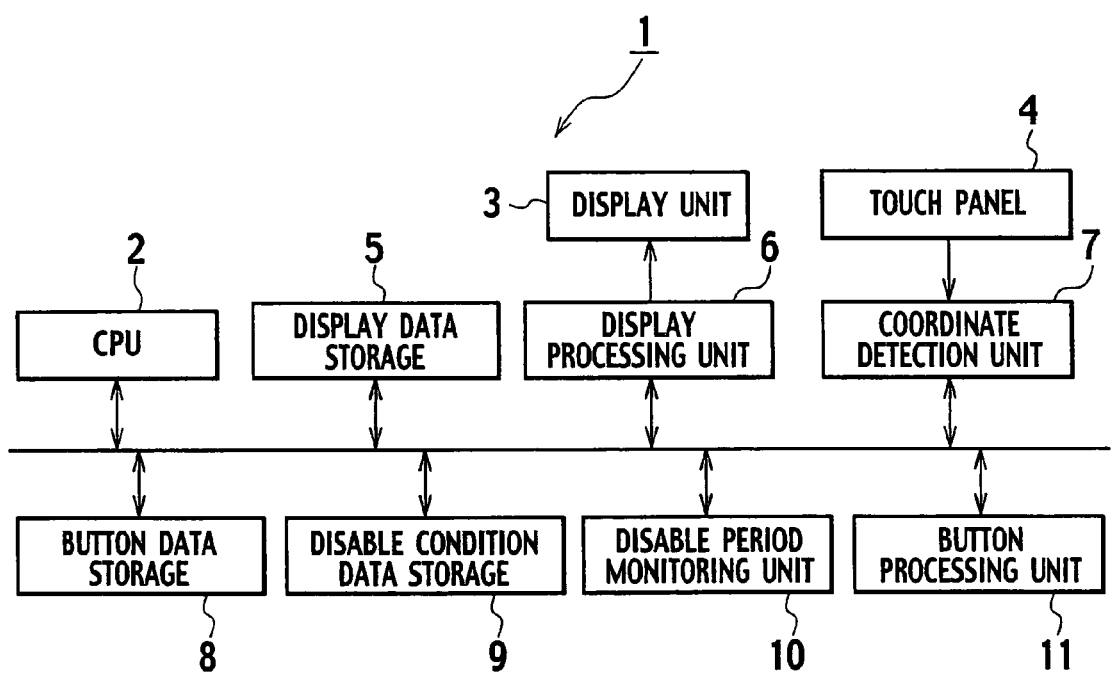
FIG. 1 is a block diagram showing a configuration of an image processing device including a touch panel according to an embodiment of the present invention.

An embodiment of the present invention will be described with reference to the accompanying drawings hereinafter. In the following description of the drawings, same or similar portions are given same or similar reference numerals.

Figure 6A:
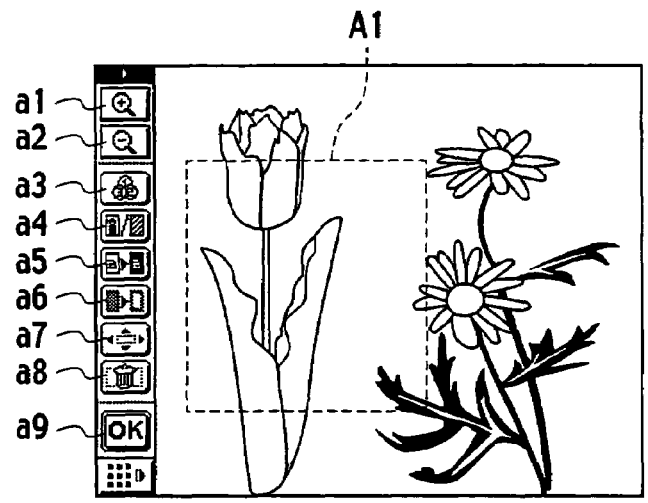
FIGS. 6A to 6C are explanatory views showing images displayed on the display unit, such as a liquid crystal display, according to the embodiment of the present invention.

FIG. 1 is a block diagram showing a configuration of an image processing device according to the embodiment of the present invention. An image processing device 1 shown in the drawing, for example, in a printing system, writes decoration patterns, such as shades and frames, in image data to be printed. The image processing device 1 includes a display unit 3 displaying an image, such as a liquid crystal display, and a touch panel 4 provided on a display screen of the display unit 3. The touch panel 4 detects a touch operation by a user with, for example, a finger or a touch pen. The display unit 3 displays an image on the entire screen and various selection buttons on a left side, for example, as shown in FIG. 6A.

The image processing device 1 further includes a display data storage 5, a display processing unit 6, a coordinate detection unit 7, a button data storage 8, a disable condition data storage 9, an disable period monitoring unit 10, and a button processing unit 11, and a CPU 2.

When the touch panel 4 detects a touch of a user at a desired position in the display unit 3, the coordinate detection unit 7 acquires coordinates on the display screen of the display unit 3 corresponding to the point of contact on the touch panel 4 and outputs data of the acquired coordinates.

The display data storage 5 stores entire image data to be displayed on the display unit 3. When a request to read image data to be displayed is generated by the display processing unit 6, the display data storage 5 extracts the image data to be read and sends the same to the display processing unit 6.

The button data storage 8 stores data of the buttons which are displayed on the display unit 3 and are selectable by the user. When a request to read the data of a selection button to be displayed is generated by the display processing unit 6, the display data storage 5 extracts the button data to be read and sends the same to the display processing unit 6.

The display processing unit 6 extracts the image to be displayed from the image data stored in the display data storage 5 and selection buttons stored in the button data storage 8 and displays the extracted image and buttons on the display unit 3.

The disable condition data storage 9 stores a condition to disable an operation of a selection button displayed on the display unit 3. In this embodiment, a condition to disable operations of specifying selection buttons within a predetermined range including the coordinates of the point of contact and the vicinity thereof in the case where the touch operation on the touch panel 4 is performed to specify a selection button displayed on the display unit 3 is stored in the disable condition data storage 9. Furthermore, a condition to disable the operations of specifying selection buttons within the predetermined range including the coordinates of the point of contact and the vicinity thereof in the case where the image and selection button displayed on the display unit 3 are changed by specifying a selection button with the touch operation on the touch panel 4 to operate a tool corresponding to the specified selection button is stored in the disable condition data storage 9.

The button processing unit 11 stores a program to execute the tool corresponding to each selection button displayed on the display unit 3 and performs a process of, when a desired selection button is specified on the touch panel 4, operating the tool corresponding to the specified selection button. For example, the button processing unit 11 executes a program of a zoom-in display tool when a selection button displayed on the display unit 3 to specify the zoom-in display tool is specified with the operation of touching the touch panel 4. An image displayed on the display unit 3 is therefore enlarged and displayed.

When a desired selection button is specified on the touch panel 4, the button processing unit 11 disables the operation of specifying the selection buttons displayed within the predetermined range including the coordinates of the point of contact and the vicinity thereof based on the disable condition stored in the disable condition data storage 9. Also in the case where the display screen is changed by specifying a selection button and a different selection button is displayed at the position of the point of contact, the button processing unit 11 disables the operations of specifying the selection buttons displayed within the predetermined range including the coordinates of the point of contact and the vicinity thereof.

When the operations of the selection buttons displayed on the display unit 3 are disabled based on the disable condition stored in the disable condition data storage 9, the disable period monitoring unit 10 measures a time after the operations of the selection buttons are disabled until the disabled states are terminated.

The CPU 2 starts a system program stored in a not-shown ROM or the like and controls the overall image processing device 1.

Next, a description is given of an operation of the image processing device 1 configured as described above according to the embodiment with reference to flowcharts shown in FIGS. 2 to 5.

Figure 2:
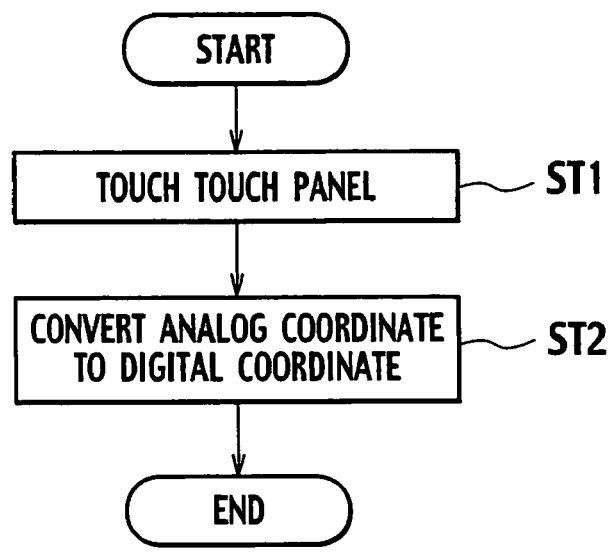
FIG. 2 is a flowchart showing a processing procedure of a coordinate input process of the image processing device including the touch panel according to the embodiment of the present invention.

FIG. 2 is a flowchart showing a processing procedure to specify the coordinates on the display screen of the display unit 3 using the touch panel 4. Upon the user touching a certain point on the display screen while an image is displayed on the display unit 3 (step ST1), the position of this point on the touch panel 4 is detected by the coordinate detection unit 7, and the coordinates on the display screen of the display unit 3 corresponding to the position of the touched point are detected (step ST2). The coordinate data on the screen of the display unit 3 of the point specified by the user can be thus obtained.

Figure 3:
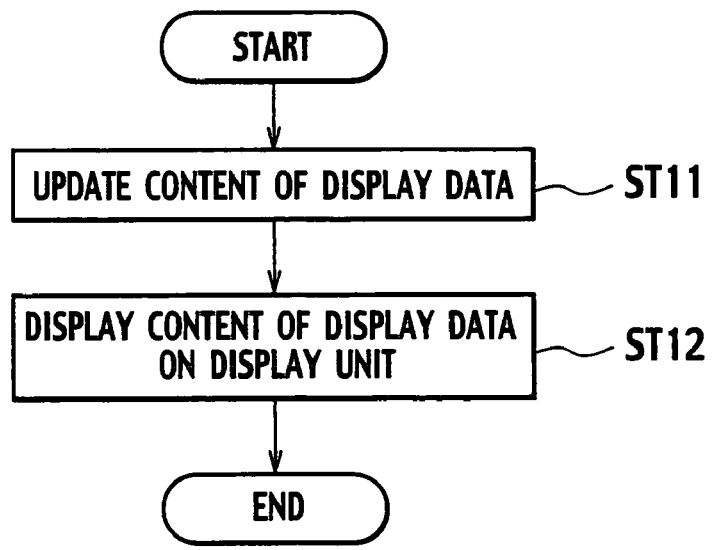
FIG. 3 is a flowchart showing a processing procedure of a process of displaying on a display unit, such as a liquid crystal display, of the image processing device including the touch panel according to the embodiment of the present invention.

FIG. 3 is a flowchart showing a processing procedure to display an image on the display unit 3. When a request to update the image displayed on the display unit 3 is generated, the display processing unit 6 updates display contents (step ST11) and displays contents of new display data on the display unit 3 (step ST12).

Figure 4:
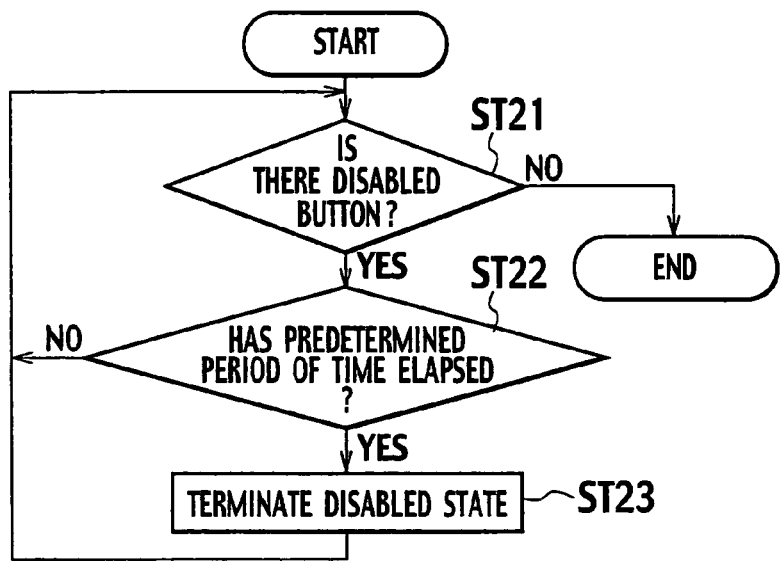
FIG. 4 is a flowchart showing a processing procedure of a disable period monitor process of the image processing device including the touch panel according to the embodiment of the present invention.

FIG. 4 is a flowchart showing a processing procedure of the disable period monitoring unit 10 to monitor the disable period of time of the specification operation of the selection button. First, it is judged whether the selection buttons displayed on the display unit 3 at the current moment includes a selection button whose specification operation is disabled (step ST21).

When no disabled selection button is included (NO in the step ST21), the process is terminated.

On the other hand, when the disabled selection button is included (YES in the step ST21), it is judged whether a predetermined period of time (for example, 3 seconds) previously set as the disable period of time has elapsed (step ST22). When the predetermined period of time has not elapsed (NO in the step ST22), the disabled state of the selection button is continued. When the predetermined time has elapsed (YES in the step ST22), the disable state is terminated (step ST23). The user can then specify the selection button which has been disabled.

Figure 5:
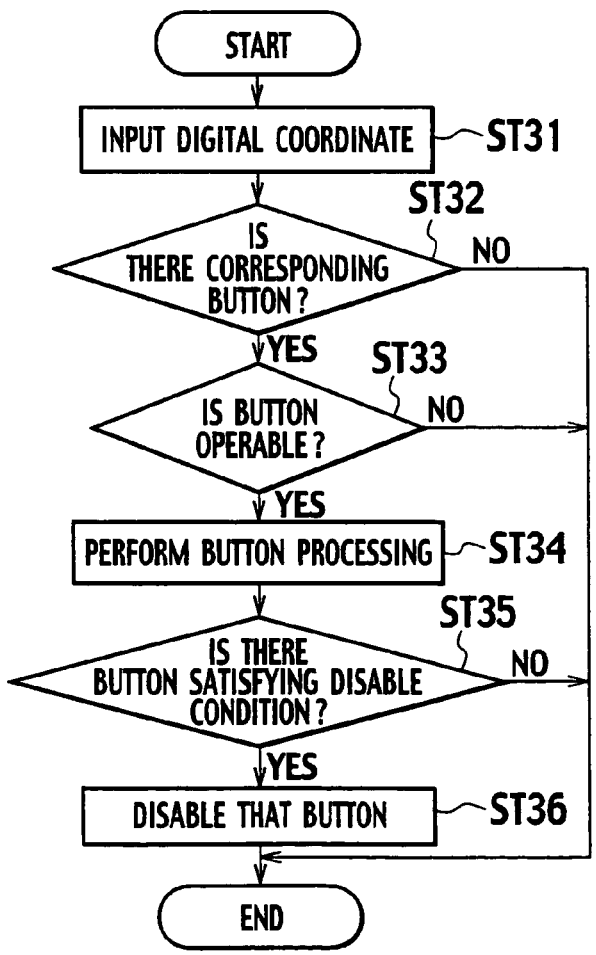
FIG. 5 is a flowchart showing a processing procedure of a selection button input process of the image processing device including the touch panel according to the embodiment of the present invention.

FIG. 5 is a flowchart showing a processing procedure to specify a selection button. First, when the user performs the touch operation at a desired point on the display screen of the display unit 3 with the touch panel 4, the position of the point of contact on the touch panel 4 is detected by the coordinate detection unit 7. Moreover, the coordinates on the display screen of the display unit 3 corresponding to the detected position is calculated, and then data of the coordinates is sent to the button processing unit 11 (step ST31).

Subsequently, the button processing unit 11 judges whether there is a selection button at the position on the display screen corresponding to the coordinate data (step ST32). When it is judged that there is no selection button (NO in the step ST32), the process is terminated. On the other hand, when it is judged that there is a selection button at the position (YES in the step ST32), it is judged whether the selection button is disabled based on the disable condition stored in the disable condition data storage 9 (step ST33)

When the selection button is judged to be disabled (NO in the step ST33), the process is terminated since the specification operation of the selection button is disabled.

When the selection button is judged to be not disabled (YES in the step ST33), a process of operating the tool corresponding to this selection button is performed (step ST34). For example, when the specified selection button is the zoom-in button and not disabled, a process of enlarging the image currently displayed on the display unit 3 is executed. At this time, the displayed image including the selection button is updated according to the contents of the process.

Furthermore, it is judged based on the disable condition stored in the disable condition data storage 9 whether there is another selection button within the predetermined range including the coordinates specified in the step ST31 and the vicinity thereof. When it is judged that there is another selection button (YES in the step ST35), this selection button is disabled for a predetermined period of time (for example, 3 seconds) (step ST36). Accordingly, the user cannot select this button for the predetermined period of time.

Furthermore, to show that the specification operation of this selection button is disabled, this selection button may be grayed out (operation unavailable indication). This enables the user to instantly recognize that this selection button cannot be specified.

Figure 6B:
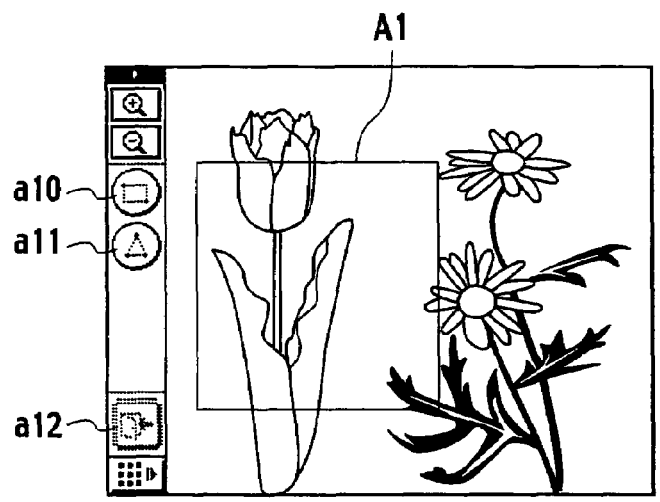
Figure 6C:
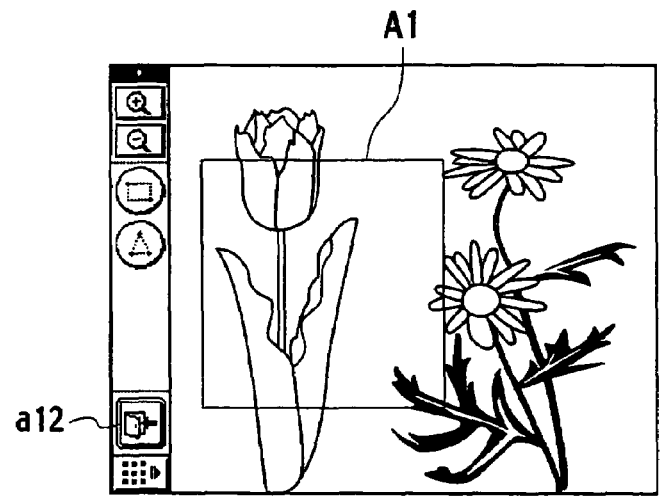

FIGS. 6A to 6C are explanatory views showing images displayed on the display unit 3, and the following description is given of changes of the display images with reference to FIGS. 6A to 6C. FIG. 6A shows a state where an image of a "flower" is displayed on the display unit 3 and a plurality of selection buttons are displayed on the left side of the screen. Reference numeral a1 denotes a zoom-in display button to perform a process of enlarging the image; a2 denotes a zoom-out display button to perform a process of reducing the image; and a3 denotes a separation button to perform a separation process.

Reference numeral a4 denotes a shading button to display a shade pattern in a selected area (for example, an area indicated by reference numeral A1); a5 denotes a reverse button to reverse and display an image in a selected area; and a6 denotes an erase button for erasing a displayed image. Moreover, reference numeral a7 denotes a move button to move the displayed image in a certain direction; a8 denotes an area cancel button to terminate a selection state of the selected area; and a9 denotes an OK button to confirm that each of the above buttons a1 to a8 is specified.

FIG. 6B shows a screen displayed after a desired process in the image shown in FIG. 6A is finished and the OK button a9 is specified. The selection buttons displayed on the left side are changed, and a rectangular area forming button indicated by a10, a polygonal area forming button indicated by a11, and an end button indicated by a12 are displayed.

In the embodiment, as described above, when an arbitrary selection button is specified on the screen, operations of selection buttons within the predetermined range including the specified position and the vicinity thereof are disabled for a predetermined period of time. Accordingly, after the OK button a9 in FIG. 6A is specified, the end button a12 displayed within a range around the OK button a9 is grayed out as shown in FIG. 6B and made inoperable for the predetermined period of time.

After the predetermined period of time, the end button a12 then becomes a usual display state as shown in FIG. 6C, and the specification operation thereof by the user is enabled.

Figure 7A:
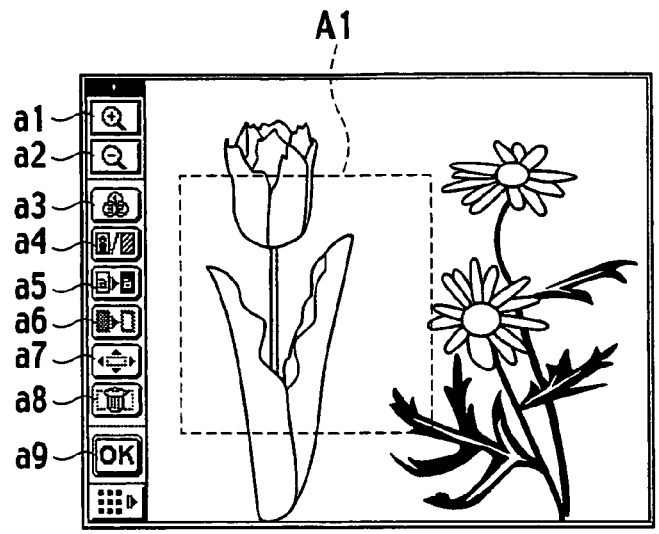
FIGS. 7A to 7C are explanatory views showing images displayed on the display unit, such as a liquid crystal display, to which the present invention is not applied.
Figure 7B:
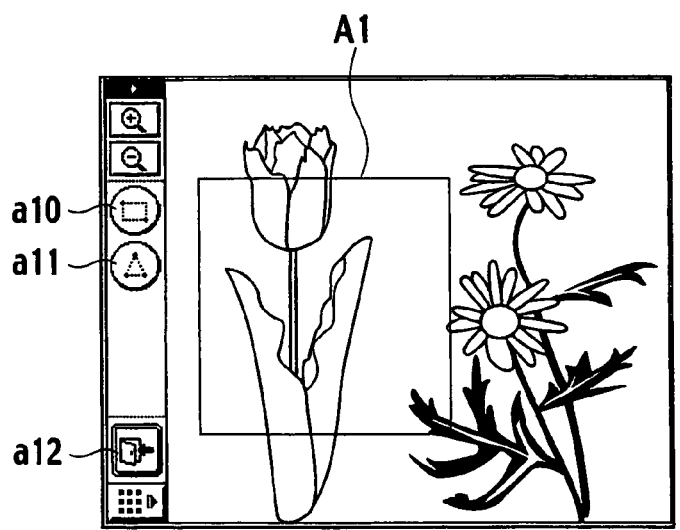
Figure 7C:
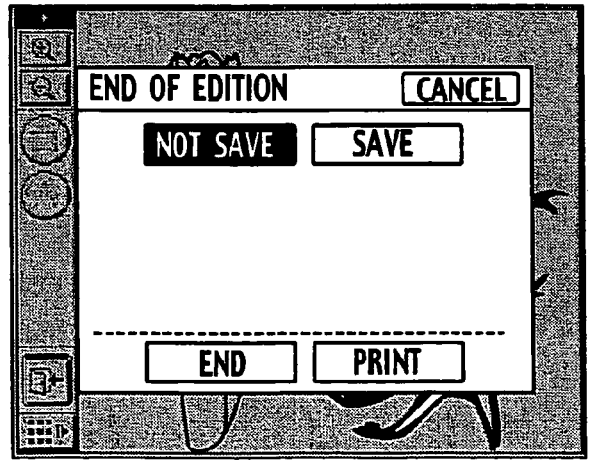

FIGS. 7A to 7C are explanatory views for comparison to FIGS. 6A to 6C and shows changes of the displayed images in the case of not including the function to disable an operation of the selection button for a predetermined period of time, which is characteristic to the present invention. In FIG. 7A, similar to FIG. 6A, an image of a "flower" is displayed on the display screen of the display unit 3, and the selection buttons a1 to a9 are displayed on the left side.

In the state of the FIG. 7A, when the user touches the touch panel 4 to specify the OK button a9, the selection buttons displayed on the left side are changed as shown in FIG. 7B, and the end button a12 is displayed at the same position as the OK button a9 is displayed on the previous screen. When the operation of specifying the end button a12 is not disabled at this time, in the case where the user accidentally performs twice the touch operation at the position of the OK button a9 on the screen of FIG. 7A, the screen shown in FIG. 7B is displayed by the first touch operation, and the second touch operation is regarded as specifying the end button a12 shown in FIG. 7B. Consequently, an end screen not intended by the user is displayed as shown in FIG. 7C.

As apparent from the above comparison, the image processing device 1 according to the embodiment can prevent the display screen from changing into a screen not intended by the user in the case where the user accidentally performs the touch operation more than once at the same point when specifying a selection button.

As described above, in the image processing device 1 according to the embodiment, when an arbitrary selection button is specified by the touch operation among various selection buttons displayed on the display unit 3, selection buttons displayed within the predetermined range including the coordinate position of the point of contact and the vicinity thereof are disabled for a predetermined period of time (for example, 3 seconds), and the selection button cannot be specified for the predetermined period of time. Accordingly, even in the case where the user accidentally performs the touch operation more than once at the selection button when specifying this selection button, the touch operation on and after the second time is disabled. This eliminates the problem in that the operation not intended by the user is inputted.

Moreover, even when the operation buttons displayed on the display screen are changed by the first specification operation, the specification operation of a new selection button displayed after the change is disabled. It is therefore possible to avoid the trouble of change into the screen not intended by the user.

Furthermore, the selection button with the specification operation disabled is displayed by an operation unavailable indication, such as a grayed out indication. Accordingly, the user can easily recognize that the specification operation of the selection button is disabled, which can prevent an unnecessary operation of specifying the disabled selection button.

Hereinabove, the description is given of the image processing device including the touch panel of the present invention based on the embodiment shown in the drawings. However, the present invention is not limited to this, and the configuration of each member can be replaced with an arbitrary configuration including a similar function.

What is claimed is:

1. An image processing device that prevents a user from unintentionally selecting a newly displayed button in the immediate vicinity of a previously selected button, comprising:
    a display unit that displays an image and a button on a display screen;
    a touch panel on the display screen, through which a user performs a touch operation on the button; and
    a button processing unit that disables, for a predetermined period of time, a newly displayed button that has position coordinates within a predetermined positional range of the touch operation and the vicinity thereof.

2. An image processing device that prevents a user from unintentionally selecting a newly displayed button in the immediate vicinity of a previously selected button, comprising:
    a display unit that displays an image and a button on a display screen;
    a touch panel on the display screen, through which a user performs a touch operation on the button;
    a coordinate detection unit that detects coordinates of the performed touch operation; and
    a button processing unit that disables, for a predetermined period of time, a newly displayed button that has position coordinates within a predetermined positional range of the touch operation and the vicinity thereof.

3. The image processing unit according to claim 2, wherein the newly displayed button is different in type from the previously selected button.

4. The image processing unit according to claim 2, wherein the button processing unit displays the newly displayed button in a disabled state during the predetermined period of time.

5. The image processing unit according to claim 3, wherein the button processing unit displays the newly displayed button in a disabled state during the predetermined period of time.

6. The image processing unit according to claim 1, wherein the button processing unit enables the newly displayed button when the predetermined period of time has elapsed.

7. The image processing unit according to claim 2, wherein the button processing unit enables the newly displayed button when the predetermined period of time has elapsed.

* * * * *